United States Patent [19]
Grimm

[11] Patent Number: 6,154,429
[45] Date of Patent: Nov. 28, 2000

[54] DEVICE FOR READING FROM AND/OR WRITING TO OPTICAL RECORDING MEDIA

[75] Inventor: Michael Grimm, Villingen-Schwenningen, Germany

[73] Assignee: Deutsche Thomson-Brandt GmbH, Villingen-Schwenningen

[21] Appl. No.: 09/162,436

[22] Filed: Sep. 28, 1998

[30] Foreign Application Priority Data

Sep. 30, 1997 [DE] Germany ............................ 197 43 068
Oct. 24, 1997 [DE] Germany ............................ 197 46 990

[51] Int. Cl.[7] ...................................................... G11B 3/90
[52] U.S. Cl. .................. 369/58; 369/124.01; 369/124.15
[58] Field of Search ............................. 369/44.25, 44.28, 369/44.29, 44.32, 44.34, 44.35, 44.36, 47, 48, 54, 58, 124.15, 124.01

[56] References Cited

U.S. PATENT DOCUMENTS

| | | | |
|---|---|---|---|
| 4,796,247 | 1/1989 | Vogelsang ............................. | 369/44.28 |
| 5,031,166 | 7/1991 | Getreuer et al. ...................... | 369/44.26 |
| 5,054,013 | 10/1991 | Kawamura ............................ | 369/44.28 |
| 5,197,054 | 3/1993 | Harada .................................. | 369/32 |
| 5,325,346 | 6/1994 | Hasegawa et al. ................... | 369/44.28 |
| 5,612,933 | 3/1997 | Iso et al. ............................... | 369/32 |
| 5,623,465 | 4/1997 | Sasaki et al. ......................... | 369/44.32 |
| 6,005,832 | 12/1999 | Kumagai ............................... | 369/44.29 X |

FOREIGN PATENT DOCUMENTS

| | | | |
|---|---|---|---|
| 514773A2 | 11/1992 | European Pat. Off. | ........ G11B 7/085 |
| 0539959 A2 | 5/1993 | European Pat. Off. | ........ G11B 7/085 |
| 0539959 A3 | 5/1993 | European Pat. Off. | ........ G11B 7/085 |

OTHER PUBLICATIONS

German Search Report dated: Feb. 16, 1998.
Patent Abstracts of Japan vol., 013, No. 557 (P–974), Dec. 12, 1989, JP 01 232582 A (NEC Corp), Sep. 18, 1989, abstract.
Patent Abstracts of Japan, vol. 097, No. 010, Oct. 31, 1997, JP 09 167354 A (NEC Corp). Jun. 24, 1997, abstract.
Copy of the European Search Report citing the above listed documents AA, AB, AC, AM, AR, AS.

*Primary Examiner*—Paul W. Huber
*Attorney, Agent, or Firm*—Joseph S. Tripoli; Paul P. Kiel

[57] ABSTRACT

A device is disclosed for reading from and/or writing to optical recording media, which has a scanner whose output is connected to the input of an analogue-to-digital converter, whose output is in turn connected to the input of a mirror signal detector. The device is able to generate a reliable mirror signal even at relatively high track crossing frequencies. The mirror signal detector has at least one element which is variable as a function of frequency.

17 Claims, 4 Drawing Sheets

DEVICE FOR READING FROM AND/OR WRITING TO OPTICAL RECORDING MEDIA

FIELD OF THE INVENTION

The present invention relates to a device for reading from and/or writing to optical recording media which has a mirror signal detector, and also to a method for the frequency-dependent formation of a parameter "mirror signal" in a corresponding device.

BACKGROUND OF THE INVENTION

A device of this type is disclosed in U.S. Pat. No. 5,325,346. This device has a scanning means for scanning an optical disk, the output of which scanning means is connected to the input of an analogue-to-digital converter, whose output is in turn connected to the input of a mirror signal detector. For different track crossing frequencies, i.e. when the scanning means crosses tracks of the recording medium at a varying speed perpendicularly to the track direction, various delay elements are provided in a TZC signal path of the known device in order to compensate for influences on a signal obtained from the TZC signal and the mirror signal, which are caused by the track crossing frequency. The known device may be regarded as having the disadvantage that although it is suitable for track crossing frequencies of varying magnitude, a correctly generated mirror signal is assumed. Since it is precisely at particularly high track crossing frequencies that problems arise in the generation of the mirror signal itself, the known device is not suitable for such high track crossing frequencies.

SUMMARY OF THE INVENTION

The object of the present invention is to propose a device which is able to generate a reliable mirror signal even at relatively high track crossing frequencies and which avoids the disadvantages known from the prior art.

This object is achieved by means of the measures specified in the claims.

To that end, it is provided that the mirror signal detector has at least one element which is variable as a function of frequency. This has the advantage that an element which is variable as a function of frequency can be adaptively matched in terms of its properties to the track crossing frequency during operation, with the result that interfering influences which occur in certain frequency ranges are compensated for or minimized in a frequency-selective manner. The mirror signal detector generates a mirror signal indicating whether the scanning means is scanning a data track or is located between two data tracks. To that end, the high-frequency signal read from the disk is considered, in general. It has a high degree of modulation if the scanning means is scanning a data track, whereas it is only weakly modulated if the scanning means is scanning between two data tracks. It is the case at high track crossing frequencies that the differences in modulation between data track and the interspace between two data tracks are only very small. This state of affairs is also addressed by means of the mirror signal detector's element which is variable as a function of frequency, in order in this case, too, to obtain an optimum mirror signal and optimum signals which are optionally derived therefrom. The scanning means may be a writing and/or reading head, generally called the pick-up in CD players.

The element which is variable as a function of frequency is preferably a filter having a variable cutoff frequency. This has the advantage that a filter of this type can easily be realized on a digital basis. For example, the cut-off frequency of the filter is varied here by changing the clock frequency at which the filter is operated. The cut-off frequency of the filter is varied as a function of the track crossing frequency. A variety of filter variants are available here. A high-pass filter is suitable for filtering out a low interfering frequency band. A bandpass filter, whose upper and lower cut-off frequencies can, if appropriate, be varied to a different extent, permits only the frequency band which is suitable and sufficient for the respective track crossing frequency to pass. A further advantage of the invention is that the frequency ranges which may be affected by interfering influences but are not absolutely necessary for mirror signal formation are masked out by means of a filter having a variable cut-off frequency.

The filter is advantageously designed as a low-pass filter. This has the advantage that the high-frequency interference is filtered out in a manner adapted to the respective track crossing frequency. For example, only low track crossing frequencies occur at the beginning and at the end of a track crossing operation, whereas the track crossing frequency can assume very high values during the track crossing operation. These high values lie at least partially in the range of the interfering influences which occur in the beginning and end phases of the track crossing operation. These interfering influences are caused for example by the modulation of the data-carrying information tracks of the optical recording medium in the longitudinal direction, which are in turn virtually insignificant at a high track crossing frequency since, in this case, the individual tracks are traversed so rapidly that the modulation in the longitudinal direction is virtually of no consequence.

The invention provides for the mirror signal detector to have two elements which are variable as a function of frequency, one of which is an averaging unit, whose input is connected to the output of the other element which is variable as a function of frequency. This has the advantage that the average value is formed such that it is likewise optimized as a function of frequency. The output signals of both elements which are variable as a function of frequency are fed for example directly or via further processing stages to a comparator which generates the mirror signal. The adaptive matching of the average value in accordance with the invention also enables the evaluation of only slightly modulated input signals, as occur, e.g. in the case of high-density recording media. In that case, when an information track is traversed, the intensity of the high-frequency signal decreases, in some instances, only by 20% in comparison with the traversal of the reflective region lying between the information tracks, whereas this value is approximately 65% in the case of conventional compact disks. The invention thus ensures an exact read-out by average value adaptation which is optimal as a function of frequency.

According to the invention, the mirror signal detector has a mirror signal-forming unit, for example a comparator, whose output is connected to the input of a frequency counter. This has the advantage that the track crossing frequency is obtained in a simple manner directly from the mirror signal by counting, for example by counting the rising edges.

The device advantageously has a logic block whose input signal is the track crossing frequency or the frequency of the mirror signal and which is connected on the output side to the element which is variable as a function of frequency. This has the advantage that the logic block, in the event of filters having a variable cut-off frequency being used, calculates the cut-off frequency that is suitable in each case according to an algorithm which is matched, if appropriate, to the specific device or to the specific type of device. It is likewise advantageously possible to look up the suitable cut-off frequency in a table which is matched to the device or to the type of device and is stored in the logic block, for example. The mirror signal detector can thus be adapted to a wide variety of devices or types of devices in a simple manner by adapting the logic block; this simplifies production.

According to a further refinement of the invention, the device has a controller which influences the threshold value-forming unit and also a track regulator. This has the advantage that in order to determine the type of optical recording medium, the track regulator is inactivated and the threshold value-forming unit is set to a fixed threshold value. The effect of switching off the track regulator is that information tracks of the recording medium are traversed. Depending on the type of recording medium, it is possible to establish a mirror signal with regard to a suitably set threshold value or this is not possible, and from this a conclusion is drawn regarding the type of optical recording medium.

An inventive method for the frequency-dependent formation of a parameter "mirror signal" in a device for reading from and/or writing to optical recording media, in particular a device specified in the apparatus claims, comprises the following method steps: An envelope signal is formed from a data signal. The envelope signal is filtered taking account of a cut-off frequency. The filtered envelope signal is compared with a threshold value. A parameter "mirror signal" is set to a first value if the filtered envelope signal lies above the threshold value, and to a second value if it lies below the threshold value. The frequency of the mirror signal is determined. The value of the cutoff frequency is changed as a function of the frequency of the mirror signal. The method subsequently branches to the first step. This has the advantage that influences due to high-frequency interference are filtered out in the respectively suitable frequency ranges, thereby achieving optimum formation of the mirror signal. The envelope signal is advantageously filtered by means of a low-pass filter whose cut-off frequency is the abovementioned cut-off frequency. The threshold value with which the filtered envelope signal is compared is also referred to as reference value in the following text. The value of the cut-off frequency is changed as a function of the frequency of the mirror signal for example by the cut-off frequency being increased given a rising frequency of the mirror signal and, on the other hand, being decreased given a falling frequency. This is advantageously effected in a linear manner, in a stepwise manner according to a table or in another suitable manner. The method according to the invention begins with the start of the track crossing operation and ends with the end of the said operation. Therefore, the branching to the first step is effected only when the track crossing operation still persists.

The invention provides for the threshold value to be formed by averaging the envelope signal, for example by low-pass filtering. This has the advantage that the threshold value for the formation of the mirror signal is also formed from the envelope signal filtered as a function of frequency and, consequently, is also free, as far as possible, from frequency-dependent interfering influences.

According to the invention, the averaging is likewise effected as a function of the frequency of the mirror signal. This has the advantage that in the event of a higher-frequency signal, the average value is also formed at a higher frequency in order to be matched as quickly as possible to a possibly altered signal intensity, as occurs e.g. in the case of recording media having a high storage density, as specified above.

The invention furthermore provides for an upper and a lower threshold value to be used instead of a single threshold value, the mirror signal being set to a first value, for example the value 1, when the upper threshold value is exceeded, and being set to a second value, for example the value 0, when the lower threshold value is undershot, its value otherwise being maintained. This has the advantage that the value of the mirror signal does not fluctuate to an unnecessarily great extent in the transition region between the two values, i.e. becomes smoother. The hysteresis prevents the value of the mirror signal from jumping back and forth in the transition region between the two values. As a result, the frequency determination of the mirror signal also becomes even more accurate and the quality of the method according to the invention is increased.

An advantageous development of the method according to the invention consists in specifying a certain threshold value and in checking whether or not a mirror signal can be established with regard thereto. This has the advantage that the type of recording medium can be determined by means of a mirror signal detector which is present in any case, i.e. without any additional outlay. If a mirror signal can be established, then a first type of recording medium is being scanned; if, on the other hand, a mirror signal cannot be established, then a second type of recording medium is involved. The different types of recording media differ, for example, in terms of their track arrangement, the size of the track width or of the track spacing, as in the case for example with conventional CDs and recording media having a high storage density, such as DVDs.

In an advantageous manner, a plurality of different threshold values are tested one after the other. This has the advantage of increasing the number of different types of recording media that can be identified. Consequently, types which vary only slightly in terms of their properties can also be distinguished using the mirror signal which can be determined with regard to different threshold values. For example, write-once, write-many and non-writable optical recording media differ, in some instances, only slightly with regard to the threshold value which is suitable for forming the mirror signal, yet they can be identified reliably by means of the method according to the invention on the basis of the plurality of threshold values used.

According to the invention, information tracks of the recording medium are traversed during the implementation of the method steps, this being effected in the simplest case by switching off a track regulator and utilizing eccentricity of the recording medium or its mounting in the device. It is particularly advantageous to actively implement traversal of information tracks. This has the advantage that the conditions for generating a mirror signal are always met and, consequently, even an absent mirror signal can be ascribed unambiguously to the type of recording medium.

Further advantages of the invention are evident from the following description of advantageous exemplary embodiments. It is understood that the invention is not restricted to the exemplary embodiments described.

DETAILED DESCRIPTION OF THE DRAWINGS

Figure 1:
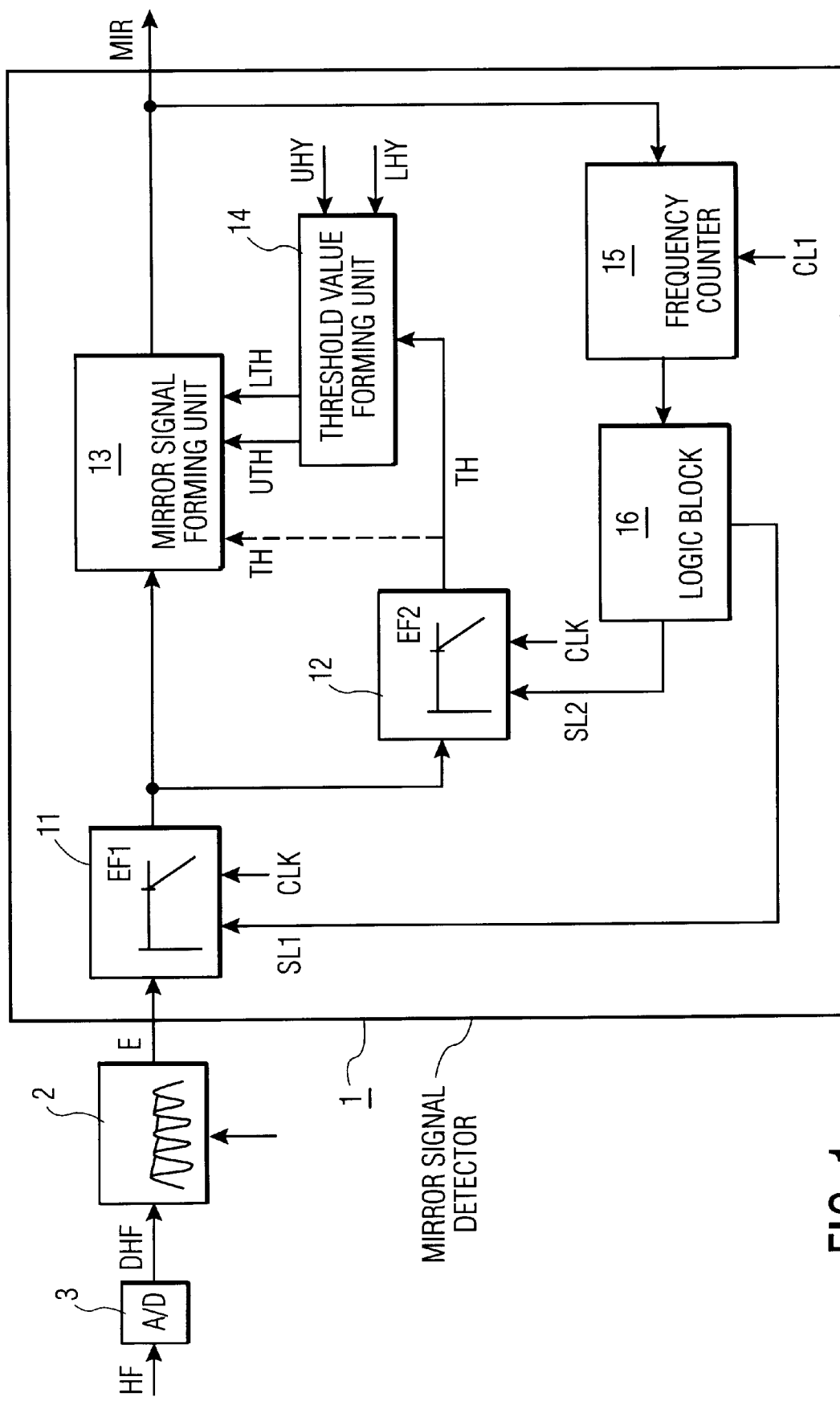
FIG. 1 shows a diagrammatic illustration of a mirror signal detector of a first exemplary embodiment of a device according to the invention.

FIG. 1 shows a diagrammatic illustration of a mirror signal detector 1 of a device according to the invention. An envelope signal E is applied to its input and the mirror signal MIR is present at its output. The envelope signal E is generated from a digitized high-frequency signal DHF by means of an envelope detector 2. In the exemplary embodiment, a peak value detector with a slowly falling hold value is used for this purpose, as is indicated in the block illustration of the envelope detector 2. The high-frequency signal DHF is generated by means of an analogue-to-digital converter 3, to whose input a high-frequency data signal HF is applied.

Figure 4:
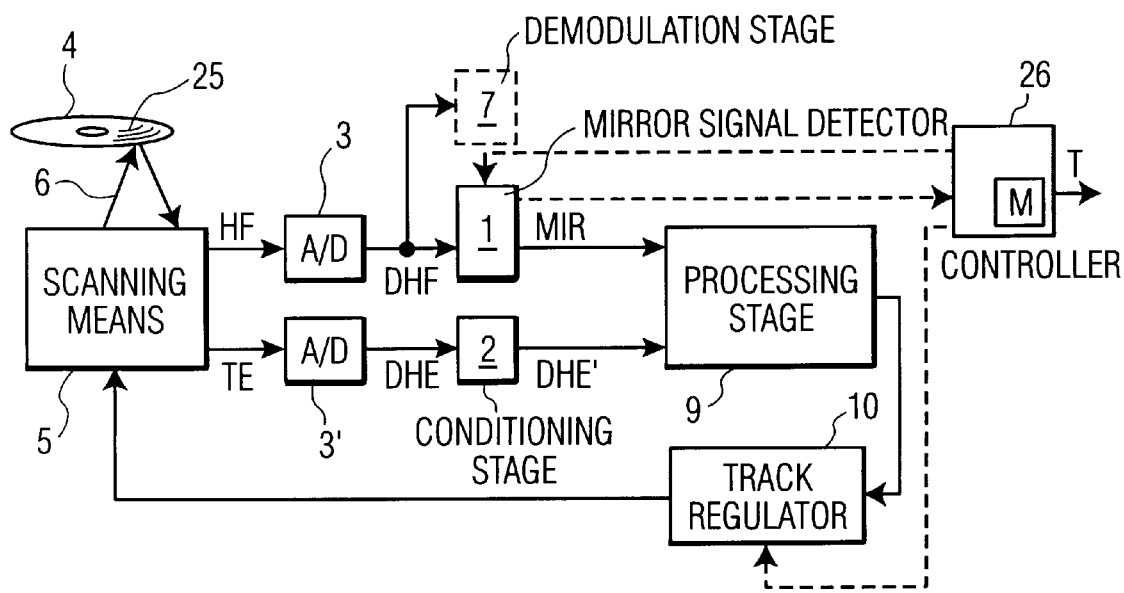
FIG. 4 shows a block diagram of a device according to the invention.

FIG. 4 shows a schematic block diagram of a device according to the invention. An optical recording medium 4, which has diagrammatically indicated, concentrically or spirally arranged information tracks 25, is scanned by means of a light beam 6 generated by a scanning means 5. The light beam 6 is in this case reflected from the optical recording medium 4 and passes to detection elements of the scanning means 5, where it is converted into a data signal HF and into error signals, specified as track error signal TE here by way of example, and output by the scanning means 5. The data signal HF is converted into a digitized high-frequency signal DHF by means of the analogue-to-digital converter 3, which signal is fed to the mirror signal detector 1, on the one hand, and to a demodulation stage 7 (only suggested here), on the other hand. The demodulation stage 7 serves to demodulate the data signal, which is modulated for recording on the recording medium 4, and to output it as audio signal or demodulated data signal. The envelope detector 2 described with regard to FIG. 1 is not illustrated separately in FIG. 4; it is part of the mirror signal detector 1, for example. The track error signal TE is also digitized by means of an analogue-to-digital converter 3', the digitized track error signal DTE is converted into a signal DTE' in a conditioning stage 8 and forwarded to a signal processing stage 9. The latter also receives the mirror signal MIR output by the mirror signal detector 1, logically combines the two signals and outputs a signal to a track regulator 10. The latter forwards an actuating signal to the scanning means 5, in order to displace the latter in the radial direction with regard to the optical recording medium 4. In the event of a normal read-out of the recording medium 4, the radial displacement serves for tracking the light beam 6 on an information track 25 of the optical recording medium 4, whereas in the event of a search operation, the radial movement of the scanning means 5 serves for the traversal of a predetermined number of information tracks 25. The number of tracks traversed may be determined in this case, for example, by counting the positive edges of the mirror signal MIR. The result is used to displace the scanning means 5 corresponding radially, so that the track sought is reached in the most exact manner possible.

A controller 26 serves to establish the type of optical recording medium 4, for example CD or DVD. To that end, an output of the controller 26 is connected to the mirror signal detector 1 in order to set a specific threshold value TH, as described further below. A further output of the control unit 26 is connected to the track regulator 10 in order to switch this regulator off or, according to another variant of the invention, in order to control this regulator in such a way that information tracks 25 are actively traversed. An output of the mirror signal detector 1 is connected to an input of the control unit 26. The type of recording medium currently being scanned is established from the signal communicated in this case, if appropriate from a plurality of communicated signals buffer-stored in a memory M.

The individual component parts of the mirror signal detector 1 will now be explained in more detail with reference to FIG. 1. The envelope signal E is fed to a digital low-pass filter 11, the cut-off frequency EF1 of which is variable and is set in accordance with a control signal SL1. In the case of the IIR filter illustrated here, this is implemented in that the system clock signal CLK is divided by a value specified by the control signal SL1 and the frequency that has been reduced in this way produces the operating clock of the digital low-pass filter 11. The lower the operating clock of the low-pass filter 11, the lower, too, is the cut-off frequency EF1 thereof. The output signal FIL of the filter 11 is fed to a mirror signal-forming unit 13 designed as a comparator, for example. According to a first configuration, the mirror signal-forming unit 13 in this case compares the signal FIL with a threshold value TH. If the value of the signal FIL lies above the threshold value TH, then the value of the mirror signal MIR is set to a first value, in this case to 1; if, on the other hand, the value of the signal FIL lies below the threshold value TH, then the mirror signal MIR is set to a second value, in this case to the value 0.

According to a second variant, the mirror signal-forming unit 13 compares the signal FIL with an upper threshold value UTH and a lower threshold value LTH. In this case, the value of the mirror signal MIR is set to 1 if the value of the signal FIL lies above the value of the upper threshold value UTH, and it is set to 0 if the value of the signal FIL lies below the lower threshold value LTH. The value of the mirror signal MIR remains unchanged as long as the value of the signal FIL is between the upper threshold value UTH and the lower threshold value LTH.

One variant of the present invention consists in keeping the threshold value TH or the upper threshold value UTH and the lower threshold value LTH constant, or not changing them as a function of frequency. It is advantageous, however, to adapt the threshold values TH or UTH and LTH as a function of frequency. A second digital low-pass filter 12 is provided for this purpose, which filter is likewise designed as an IIR filter. As described with regard to the filter 11, the cut-off frequency EF2 of the filter 12 is varied as a function of frequency by reducing the system clock signal CLK by a factor specified by a control signal SL2 to form the operating clock of the filter 12. From the input signal of the filter 12, the signal FIL, an average value free from higher-frequency deviations is formed, by virtue of a suitably selected filter characteristic, and output as threshold value TH. The filter 12 thus acts as an averaging unit. The threshold value TH is fed directly to the mirror signal-forming unit 13 according to the first variant described above, this being illustrated by a dashed line in FIG. 1. It is advantageous, however, to feed the threshold value TH to a threshold value-forming unit 14, which forms the upper threshold value UTH and the lower threshold value LTH from the threshold value TH by means of an upper hysteresis value UHY and a lower hysteresis value LHY, for example by addition or subtraction.

The mirror signal MIR is both output and fed to a frequency counter 15 within the mirror signal detector 1. This frequency counter operates with a fixed clock signal CL1, which can be adapted in a device-specific manner but is constant during operation. In the exemplary embodiment, the frequency counter 15 is designed as an 8-bit counter whose overflow forms the output signal. If the output signal of the frequency counter 15 is to have a higher frequency, then provision is made for outputting the value of the highest or of the second-highest counter bit. Any other bit is also suitable for this purpose, depending on the desired frequency. The output signal of the frequency counter 15 forms the input signal of a logic block 16, which sets the control signals SL1 and SL2 in accordance with its input signal using specified threshold values, in accordance with a specified algorithm, or using a stored table.

The exemplary embodiment described enables a correct mirror signal MIR to be obtained even when an optical recording medium 4 having a high storage density is used, such as a DVD, for example, and in the event of high track crossing frequencies. In this case, the envelope signal E is compared with a threshold value TH in order to generate the mirror signal MIR. Since the envelope signal E is modulated only by about 20% with respect to the maximum value during track crossing in the case of recording media 4 having a high storage density, whereas this figure is about 65% in the case of conventional recording media, such as in the case of a CD, frequency-dependent adaptive filters 11, 12 are provided according to the invention. The frequency dependence in this case begins with a low cut-off frequency EF1, EF2 at the beginning of a track crossing operation in order to suppress high-frequency interfering influences lying, for instance, in the frequency range of the track crossing frequency at a maximum track crossing speed. As the track crossing speed rises, that is to say as the frequency of the mirror signal MIR rises, the cut-off frequency EF1 and/or EF2 is increased in order to allow the frequencies then necessary to pass. Towards the end of the track crossing operation, the cut-off frequency EF1, EF2 is decreased again. In order to take account of the relatively narrow modulation bandwidth of the envelope signal E, which is of the order of magnitude of only 20%, as described, the second low-pass filter 12 is provided for the purpose of forming the threshold value TH, which filter reacts rapidly to changes in the amplitude of the data signal HF and thus of the envelope signal E, which may be caused for example by eccentricity of the recording medium 4, by changes in the reflectivity, or by other interfering influences. The low-pass filter 12 is also adaptable as a function of frequency. The frequency-dependent adaptation of the filters 11, 12 depends on the track crossing frequency, for which reason a measure of this frequency is obtained from the period of the mirror signal MIR. The envelope signal E is generated by means of the envelope detector 2 by detection of the peak value and slow falling, as indicated symbolically.

Figure 2:
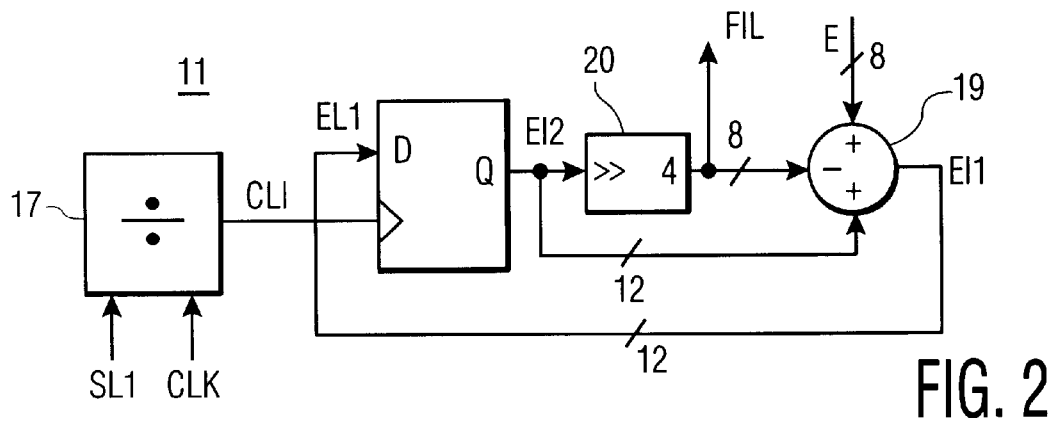
FIG. 2 shows an exemplary embodiment of a frequency-dependent variable filter.

An example of a low-pass filter 11 is specified in FIG. 2. An internal clock signal CLI is generated in the divider 17 from the system clock signal CLK, which is preferably about 27 MHz, and the control signal SL1 in accordance with the formula CLI=CLK/SL1. A shift register 18 is clocked by the internal clock signal CLI; a first internal signal EI1 is applied to the input (indicated by D) of the said shift register and a second internal signal EI2 is output at the output (designated by Q) of the said shift register. In the exemplary embodiment, the internal signals EI1, EI2 are specified in a 12-bit representation, which is evident from the stroke and indication of the number of bits on the corresponding data lines. The first internal signal EI1 is formed in a summer 19 from the second internal signal EI2 by addition of the envelope signal E, which is applied to the filter 11 as input signals, and subtraction of the output signal FIL, which is output by the filter 11. The output signal FIL in this case comprises the most significant eight bits of the second internal signal EI2, which bits are clipped from the said second internal signal by the limiter 20. The filter 11 thus performs a low-pass filter function since variations in the input signal E appear in the output signal FIL only when they lie below the frequency specified by the internal clock signal CLI. The filter 11 is adaptable as a function of frequency since the internal clock signal CLI can be varied via the control signal SL1. The filter 12 is preferably constructed in a manner corresponding to the filter 11 illustrated in FIG. 2, the control signal SL1 being replaced by the control signal SL2, the envelope signal being replaced by the signal FIL as input signal and the threshold value TH being used instead of the signal FIL as output signal.

Figure 3:
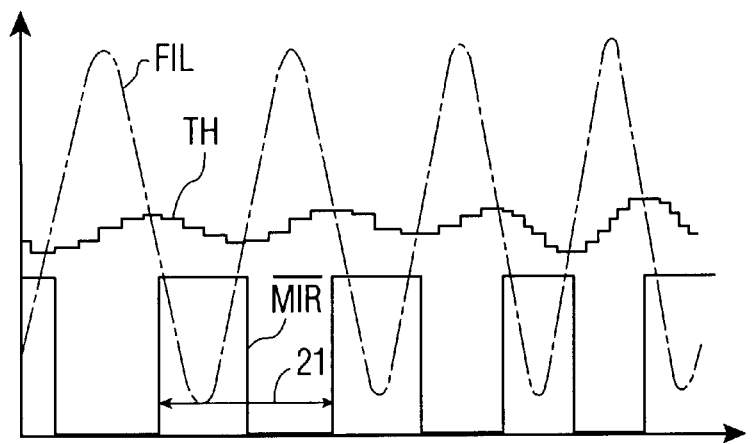
FIG. 3 shows a diagram of typical signals occurring in a device according to the invention.

FIG. 3 illustrates the typical profile of a number of signals occurring in the device according to the invention against the time t. The output signal FIL corresponding to the filtered envelope signal E is free from high-frequency interfering superpositions. The signal of the threshold value TH which is obtained by low-pass filtering is derived from the signal FIL. It is modulated to a lesser extent than the signal FIL and has steps on account of the internal clock of the filter 12. The mirror signal MIR, which is illustrated as inverted mirror signal $\overline{\text{MIR}}$ in FIG. 3, is formed in the mirror signal-forming unit 13 by comparison of the signals FIL and TH. $\overline{\text{MIR}}$ is at a value "high" or 1 when the signal FIL is below the threshold value TH, while the inverted mirror signal $\overline{\text{MIR}}$ is at "low" or the value 0 when the signal FIL is above the threshold value TH. The arrow 21 indicates the period length of the mirror signal MIR, this period length yielding the track crossing frequency which is utilized, in turn, for adaptation of the filters 11 and 12.

Figure 5:
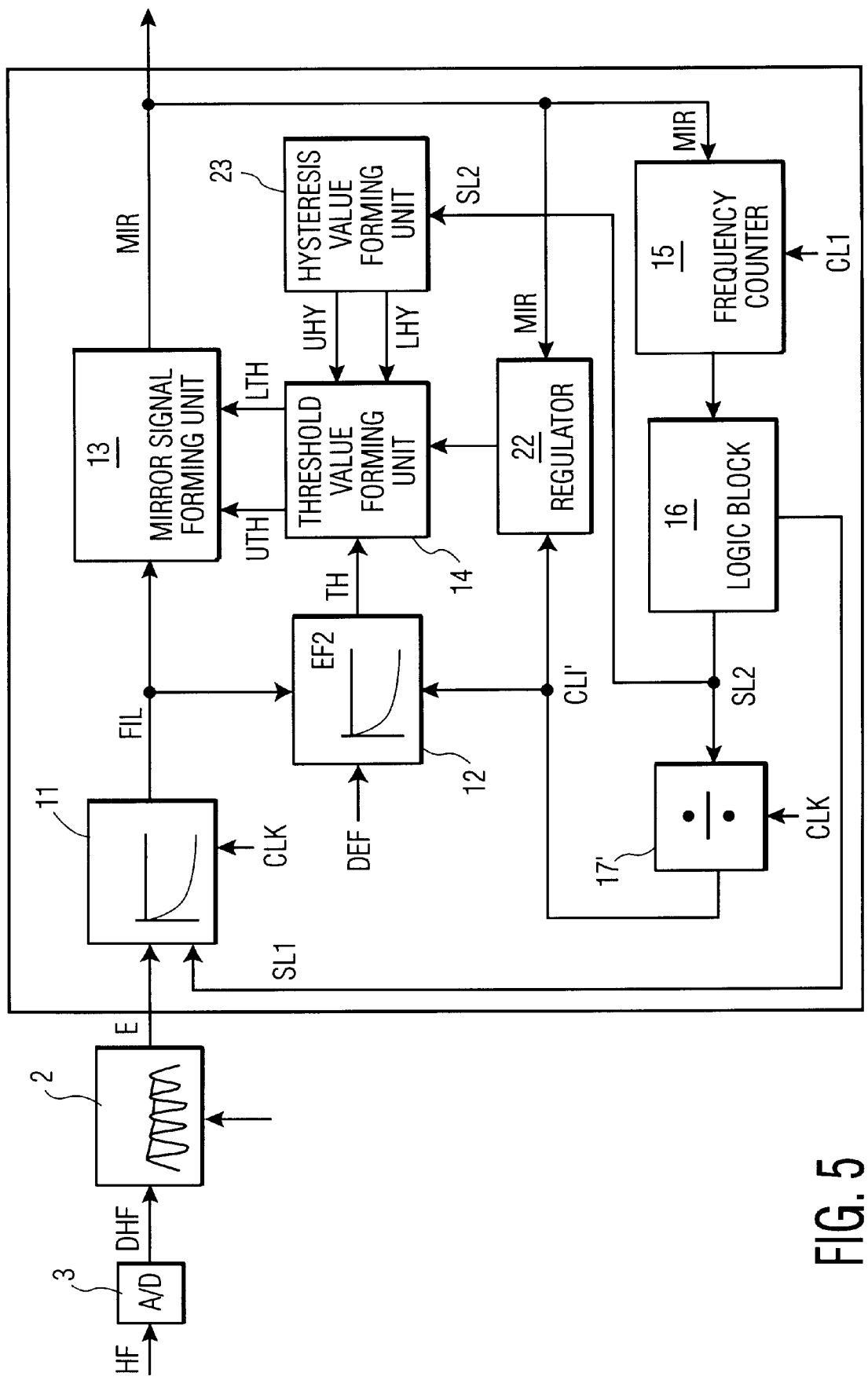
FIG. 5 shows a diagrammatic illustration of a mirror signal detector of a second exemplary embodiment of a device according to the invention.

FIG. 5 shows a second exemplary embodiment of the present invention. Identical elements are designated by the same reference symbols as for the preceding figures and, insofar as their function is identical, are not described in further detail. Individual advantageous configurations described with regard to this exemplary embodiment can also advantageously be used individually or in combination in other configurations of the invention. The control signal SL2 output by the logic block 16 serves to convert the system clock signal CLK into an internal clock signal CLI' by means of a divider 17'. The internal clock signal CLI' is fed to the filter 12 as clock signal. The filter 12 and also the filter 11 are symbolized as general IIR filters. The filter 12 has a control signal input to which a defect signal DEF is applied. This signal is generated in a manner not illustrated here and indicates when interference occurs in the data signal HF due to a defect in the optical recording medium 4, for example. In such a case, it is practical for the threshold value TH not to track immediately every variation in the signal FIL since, in the event of a defect, this variation is generally based on interfering influences. The operating clock of the filter 12, which is specified by the internal clock signal CLI, is therefore reduced by a factor specified by the defect signal DEF, with the result that after the defect has ended, the threshold value TH is as close as possible to the preceding threshold value, the latter generally being, in all probability, the value which is suitable after the defect as well.

As a supplement to the threshold value TH formed by means of the low-pass filter 12, a regulator 22 is provided which checks the so-called duty cycle of the mirror signal MIR and causes the threshold value-forming unit 14, if appropriate, to modify the upper and lower threshold values UTH and LTH that it outputs. Duty cycle is understood to mean the ratio between the time duration of "high" phases, in which a signal assumes the value "high" or 1, and the time duration of "low" phases, in which a signal assumes the value 0 or "low". Since the width of the tracks and the width of the interspace between two tracks are generally the same in optical recording media, a duty cycle of 50:50 is produced for the mirror signal MIR. If deviations from this value occur, then this is an indication of the fact that the mirror signal MIR is not correctly formed. An option for correction is to vary the threshold values TH or UTH and LTH used for forming the mirror signal MIR such that the requisite duty cycle is established. In the present exemplary embodiment, the duty-cycle regulator 22 is provided only as a supplement to the generation of the threshold value TH by means of the filter 12, but the threshold values UTH and LTH may also be formed exclusively by means of the regulator 22. In this case it is possible to dispense with the filter 12. In an advantageous manner, as described above, in the event of a defect the influence of the low-pass filter is reduced by decreasing its internal clock frequency. A likewise advantageous variant is to completely switch off the filter 12 in the event of a defect and simultaneously hold the last output value of the filter 12. The regulator 22 is operated with the internal clock signal CLI' and is designed for a duty cycle of 50:50; however, it can also be adapted to the duty cycle of recording media which require a different duty cycle.

A further advantageous refinement of the invention consists in also varying the hysteresis values UHY and LHY as a function of frequency. The upper threshold value UTH is formed from the threshold value TH by addition of the upper hysteresis value UHY, while the lower threshold value LTH is formed by subtraction of the lower hysteresis value LHY from the threshold value TH. To that end, a hysteresis value-forming unit 23 is provided which, as a function of the control signal SL2, that is to say as a function of the frequency of the mirror signal MIR, varies the hysteresis values UHY and LHY for example linearly or using a specified, device-specific table.

Figure 6:
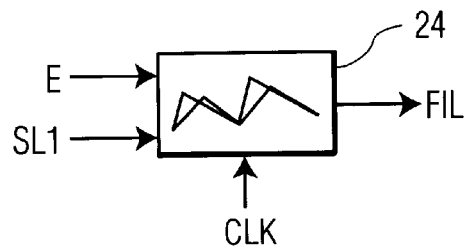
FIG. 6 shows a block illustration of a further frequency-dependent filter.

FIG. 6 shows a block illustration of a further frequency-dependent filter which can be used according to the invention and is designed as counter 24. It operates with the system clock signal CLK reduced in accordance with the control signal SL1 and counts up as long as its input signal, the envelope signal E, is greater than the current counter reading, otherwise it counts down. The input signal E is illustrated as a solid line and the counter reading as a stepped curve. The counter reading is simultaneously the output signal FIL of the counter 24. The counter 24 can be used both instead of the filter 11 and instead of the filter 12.

According to a variant of the invention which is not illustrated here, provision is made for inserting an equalizer between analogue-to-digital converter 3 and envelope detector 2, at which location the said equalizer already reduces interfering influences as far as possible. The operating clock of the filter 12 is generally lower than that of the filter 11, but not too low, in order to avoid so-called aliasing effects.

The inventive method for the frequency-dependent formation of the parameter mirror signal MIR is described with reference to FIG. 1. In a first method step, the envelope signal E is formed from the data signal HF by means of the envelope detector 2. It is subsequently filtered by means of the filter 11 taking account of a cut-off frequency EF1. The filtered envelope signal FIL is then compared with a threshold value TH by means of the mirror signal-forming unit 13. The parameter mirror signal MIR is set to a first value if the filtered envelope signal FIL lies above the threshold value TH, and to a second value if it lies below the threshold value TH. In step e), the frequency of the mirror signal MIR is determined by means of the frequency counter 15. The value of the cut-off frequency EF1, EF2 is changed as a function of the frequency of the mirror signal MIR in step f). As long as the track crossing operation has not yet concluded, branching to the first step subsequently takes place, otherwise the method is ended. The threshold value TH is formed by averaging the envelope signal E by means of the filter 12. This averaging likewise takes place as a function of the frequency of the mirror signal MIR, in this case by corresponding variation of the control signal SL2. An upper threshold value UTH and a lower threshold value LTH are formed from the threshold value TH by means of the threshold value-forming unit 14. The parameter mirror signal MIR is in this case set to a first value if the filtered envelope signal FIL lies above the upper threshold value UTH, and to a second value if it lies below the lower threshold value LTH, otherwise the preceding value of the parameter mirror signal MIR is maintained.

Figure 7:
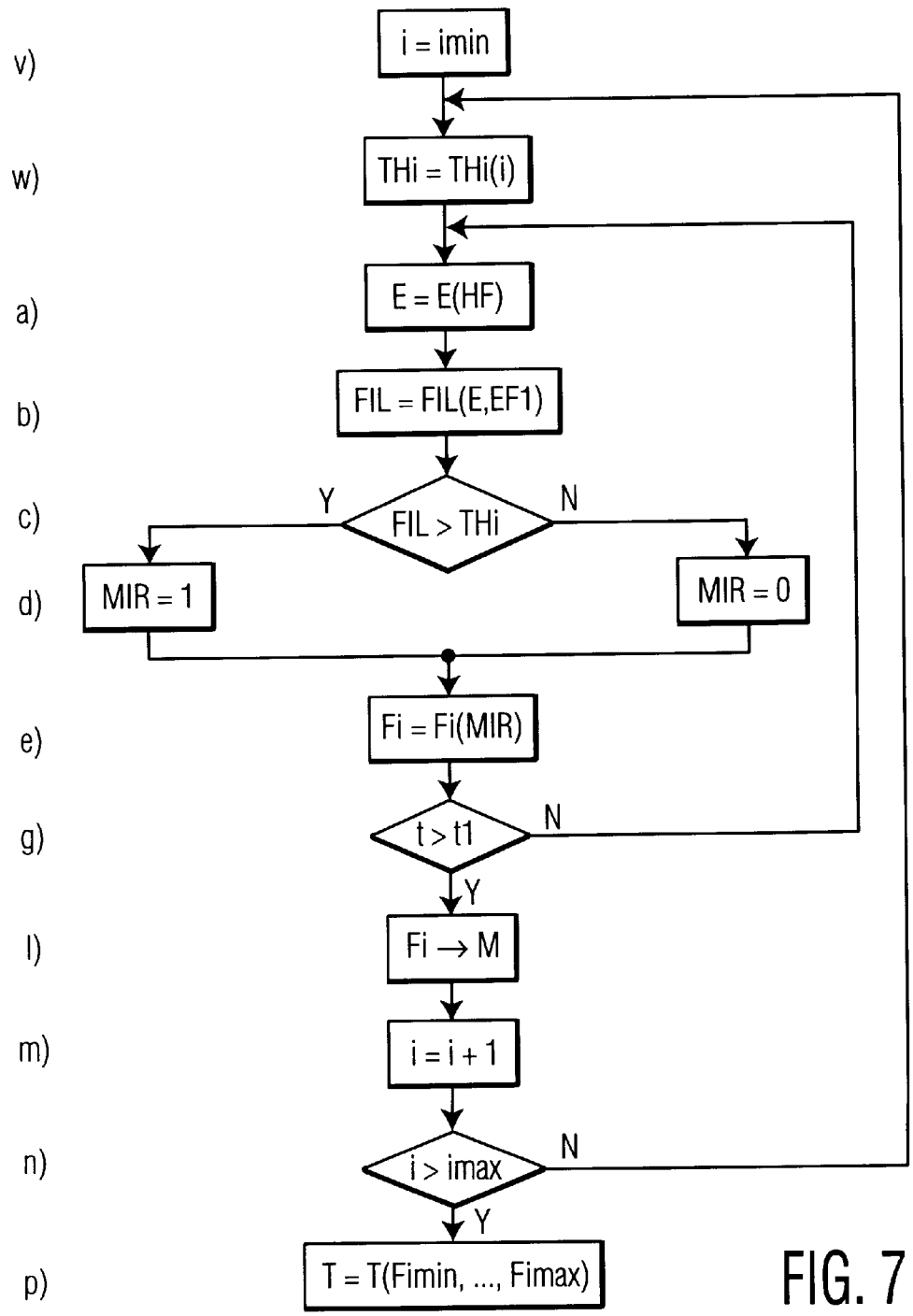
FIG. 7 shows a flow diagram of a method according to the invention.

FIG. 7 represents a flow diagram of an exemplary embodiment of an inventive method for identifying the type of an optical recording medium. The principle behind this method consists in utilizing a parameter mirror signal MIR in a device for reading from and/or writing to optical recording media 4. To that end, in step w) a threshold value THi is specified which, in step c), is compared with an output signal FIL derived from the data signal HF, from which the mirror signal MIR is formed in step d). In step e), a check is made to see whether a mirror signal MIR can be formed with regard to the threshold value THi, that is to say whether the value of the mirror signal MIR remains constant or changes with a frequency Fi, which may very well vary. From this information, in the simplest case Fi=0 or Fi≠0, the type of recording medium 4 is determined. In this case, the setting of the threshold value THi is initiated by the controller 26, which correspondingly drives the threshold value-forming unit 14 of the mirror signal detector 1, receives from the latter the frequency Fi and determines the type.

The following method steps are advantageously implemented but are not all absolutely necessary for the method according to the invention. In step v), a counter value i is set to a start value imin. In the normal case, imin=1, and the count is required only when it is intended to specify more than one threshold value TH. In step w), a threshold value TH is set to a specified threshold value THi in accordance with the count i. Steps a) and b), that is to say the formation of an envelope signal E from the data signal HF and the filtering of the envelope signal E taking account of a cut-off frequency EF1, correspond to the exemplary embodiment described further above. The filtered envelope signal FIL is compared with the threshold value THi in step c), and in step d) the parameter mirror signal MIR is set to a first value, in this case the value 1, if the filtered envelope signal FIL lies above the threshold value THi, and to a second value, in this case the value zero, if it lies below the threshold value THi. The frequency Fi of the mirror signal MIR is determined in step e). Branching to step a) takes place in step g) if a specified first time interval t1 has not yet been exceeded. The time interval t1 is selected such that steps a) to e) are iterated sufficiently to enable a meaningful frequency Fi to be established. The value of the frequency Fi is stored in the memory M in step l) after the first time interval t1 has been exceeded. This storage operation can be omitted if only a single threshold value THi is used in the method. The incrementing of the counter value i by a specified value, in general by the value 1, in step m) is also necessary only when a plurality of threshold values are used. In step n), branching to step w) is effected as often as until the count i has exceeded a specified end value imax. Subsequently, in step p) the type of recording medium 4 is determined from the frequencies Fi established, it generally sufficing to distinguish between Fi=0 and Fi≠0. The invention guarantees that a mirror signal MIR can always be generated by ensuring that information tracks 25 of the recording medium 4 are traversed at the same time as the implementation of the method steps. For this purpose, the normal tracking regulating mode of the track regulator 10 is inactivated prior to implementation of the first method step v) and is reactivated at the end of the last step p). During Implementation of method steps v) to p), the scanning means 5 is driven in such a way that information tracks 25 are traversed, for example by the use of a suitable operating mode of the track regulator 10.

What is claimed is:

1. A device for reading from or writing to optical recording media, which has a scanning means, whose output is connected to the input of an analogue-to-digital converter, whose output is in turn connected to the input of a mirror signal detector, wherein the mirror signal detector has at least one element which is variable as a function of frequency.

2. The device according to claim 1, wherein the element which is variable as a function of frequency is a filter having a variable cut-off frequency.

3. The device according to claim 2, wherein the filter is a low-pass filter.

4. The device according to claim 1, wherein the mirror signal detector has two elements which are variable as a function of frequency, one of which is an averaging unit, whose input is connected to the output of the other element which is variable as a function of frequency.

5. The device according to claim 1, wherein the mirror signal detector has a mirror signal-forming unit whose output is connected to the input of a frequency counter.

6. The device according to claim 5, wherein the output of the frequency counter is connected to the input of a logic block, an output of which is connected to an element which is variable as a function of frequency.

7. The device according to claim 1, wherein a controller for influencing a threshold value-forming unit and a track regulator is present.

8. A method for the frequency-dependent formation of a parameter mirror signal in a device for reading from or writing to optical recording media, comprising the following method steps:
    a) forming an envelope signal from a data signal;
    b) filtering the envelope signal taking account of a cut-off frequency;
    c) comparing the filtered envelope signal with a threshold values
    d) setting the parameter mirror signal to a first value if the filtered envelope signal lies above the threshold value, and to a second value if it lies below the threshold value;
    e) determining the frequency of the mirror signal;
    f) changing the value of the cut-off frequency as a function of the frequency of the mirror signal; and
    g) branching to step a).

9. The method according to claim 8, wherein steps c) and d) are carried out as follows:
    j) forming an upper threshold value and a lower threshold value from a first threshold value;
    k) setting the parameter mirror signal to a first value if the filtered envelope signal lies above the upper threshold value, and to a second value if it lies below the lower threshold value, otherwise maintenance of the preceding value of the parameter mirror signal.

10. The method according to claim 8, wherein the following method step is carried out between method steps b) and c):
    h) forming a threshold value by averaging the envelope signal.

11. The method according to claim 10, wherein steps c) and d) are carried out as follows:
    j) forming an upper threshold value and of a lower threshold value from a first threshold value;
    k) setting the parameter mirror signal to a first value if the filtered envelope signal lies above the upper threshold value, and to a second value if it lies below the lower threshold value, otherwise maintenance of the preceding value of the parameter mirror signal.

12. The method according to claim 10, wherein the averaging in step h) is likewise effected as a function of the frequency of the mirror signal.

13. The method according to claim 12, wherein steps c) and d) are carried out as follows:
    j) forming an upper threshold value and a lower threshold value from a first threshold value;
    k) setting the parameter mirror signal to a first value if the filtered envelope signal lies above the upper threshold value, and to a second value if it lies below the lower threshold value, otherwise maintenance of the preceding value of the parameter mirror signal.

14. A method for identifying an optical recording medium type by means of a parameter mirror signal in a device for reading from or writing to optical recording media, which device has a scanning means, whose output is connected to the input of an analogue-to-digital converter, whose output is in turn connected to the input of a mirror signal detector, and wherein the mirror signal detector has at least one element which is variable as a function of frequency, wherein a threshold value is specified and a check is made to see whether a mirror signal can be formed with regard to the threshold value, and in that the type of recording medium is determined from this information.

15. The method according to claim 14, wherein information tracks of the recording medium are traversed simultaneously.

16. The method according to claim 14, comprising the following method steps:
    v) setting a counter value to a start value;
    w) setting a threshold value to a specified threshold value;
    a) forming an envelope signal from a data signal;
    b) filtering the envelope signal taking account of a cut-off frequency;
    c) comparing the filtered envelope signal with the threshold value;
    d) setting the parameter mirror signal to a first value if the filtered envelope signal lies above the threshold value, and to a second value if it lies below the threshold value;
    e) determining the frequency of the mirror signal;

g) branching to step a) if a specified first time interval is not exceeded;

l) storing the value of the frequency if the first time interval is exceeded;

m) incrementing the counter value by a specified value;

n) branching to step w) if the counter value does not exceed a specified end value; and p) determining the type of recording medium from the frequencies established.

17. The method according to claim 16, wherein information tracks of the recording medium are traversed simultaneously.

* * * * *